United States Patent [19]

Young et al.

[11] Patent Number: 4,861,644
[45] Date of Patent: Aug. 29, 1989

[54] PRINTED MICROPOROUS MATERIAL

[75] Inventors: James Young, Corvallis, Oreg.; Dennis D. Leatherman, Upper St. Clair, Pa.

[73] Assignee: PPG Industries, Inc., Pittsburgh, Pa.

[21] Appl. No.: 238,684

[22] Filed: Aug. 30, 1988

Related U.S. Application Data

[63] Continuation-in-part of Ser. No. 42,404, Apr. 24, 1987, abandoned.

[51] Int. Cl.[4] .................. B32B 3/00; B32B 3/26; B32B 27/14
[52] U.S. Cl. ........................... 428/195; 101/483; 101/450.1; 346/1.1; 427/256; 428/207; 428/317.9; 428/910
[58] Field of Search ............... 101/426, 450.1; 346/1.1; 427/256; 428/187, 195, 207, 317.9, 220, 910

[56] References Cited

U.S. PATENT DOCUMENTS

| | | | |
|---|---|---|---|
| 2,772,322 | 11/1956 | Witt et al. | 136/146 |
| 2,823,421 | 2/1958 | Scarlett | 264/216 |
| 3,208,100 | 9/1965 | Nash | 264/288.4 |
| 3,214,503 | 10/1965 | Markwood | 264/210.1 |
| 3,256,216 | 6/1966 | Erickson | 521/114 |
| 3,256,374 | 6/1966 | Suzuki | 264/109 |
| 3,351,495 | 11/1967 | Larsen et al. | 136/146 |
| 3,426,754 | 2/1969 | Bierenbaum et al. | 128/156 |
| 3,536,796 | 10/1970 | Rock | 264/49 |
| 3,555,129 | 1/1971 | Fukada et al. | 264/41 |
| 3,558,764 | 1/1971 | Isaacson et al. | 264/565 |
| 3,567,666 | 3/1971 | Berger | 521/64 |
| 3,634,184 | 1/1972 | Wang | 428/262 |
| 3,675,391 | 7/1972 | Gallacher | 55/16 |
| 3,679,538 | 7/1972 | Druin et al. | 428/338 |
| 3,679,540 | 7/1972 | Zimmerman et al. | 428/265 |
| 3,696,061 | 10/1972 | Selsor et al. | 521/64 |
| 3,725,520 | 4/1973 | Suzuki et al. | 264/41 |
| 3,745,057 | 7/1973 | Loft et al. | 428/44 |
| 3,784,490 | 1/1974 | Rainer et al. | 264/122 |
| 3,797,494 | 3/1974 | Zaffaroni | 128/268 |
| 3,798,294 | 3/1974 | Hollenbeck | 264/41 |
| 3,799,828 | 3/1974 | Takashi et al. | 156/229 |
| 3,801,692 | 4/1974 | Zimmerman | 264/154 |
| 3,819,106 | 6/1974 | Schuster | 229/62 |
| 3,839,516 | 10/1974 | Williams et al. | 264/41 |
| 3,843,761 | 10/1974 | Blerenbaum et al. | 264/154 |
| 3,844,865 | 10/1974 | Elton et al. | 156/229 |
| 3,862,030 | 1/1975 | Goldberg | 210/24 |
| 3,865,674 | 2/1975 | Duling et al. | 428/158 |
| 3,870,593 | 3/1975 | Elton et al. | 428/156 |
| 3,903,234 | 9/1975 | Ikeda et al. | 264/154 |
| 3,917,772 | 11/1975 | Hollenbeck | 264/41 |
| 3,920,785 | 11/1975 | Druin et al. | 264/154 |
| 3,948,254 | 4/1976 | Zaffaroni | 128/127 |
| 3,953,566 | 4/1976 | Gore | 264/288 |
| 3,954,927 | 5/1976 | Duling et al. | 264/49 |
| 3,956,020 | 5/1976 | Weininger et al. | 136/146 |
| 3,962,153 | 6/1976 | Gore | 521/79 |
| 3,967,978 | 7/1976 | Honda et al. | 136/146 |
| 3,993,566 | 11/1976 | Goldberg et al. | 210/433 M |
| 3,996,934 | 12/1976 | Zaffaroni | 128/268 |
| 4,024,323 | 5/1977 | Versteegh | 429/249 |
| 4,031,894 | 6/1977 | Urquhart et al. | 128/268 |
| 4,102,746 | 7/1978 | Goldberg | 435/96 |
| 4,116,892 | 9/1978 | Schwarz | 521/62 |
| 4,138,459 | 2/1979 | Brazinsky et al. | 264/154 |
| 4,153,664 | 5/1979 | Sabee | 264/289 |
| 4,169,014 | 9/1979 | Goldberg | 435/182 |
| 4,187,390 | 2/1980 | Gore | 174/102 R |
| 4,190,707 | 2/1980 | Doi et al. | 429/254 |
| 4,191,719 | 3/1980 | Jack et al. | 264/41 |
| 4,194,041 | 3/1980 | Gore et al. | 428/424 |
| 4,194,622 | 3/1980 | Lewis | 206/363 |
| 4,210,709 | 7/1980 | Doi et al. | 429/250 |
| 4,237,083 | 12/1980 | Young et al. | 264/41 |
| 4,247,498 | 1/1981 | Castro | 264/41 |
| 4,255,376 | 3/1981 | Soehngen | 264/145 |
| 4,257,997 | 3/1981 | Soehngen et al. | 264/145 |
| 4,273,816 | 6/1981 | Tollette | 428/35 |
| 4,273,819 | 6/1981 | Schmidle et al. | 428/159 |
| 4,331,622 | 5/1982 | Doi et al. | 264/45.3 |
| 4,335,193 | 6/1982 | Doi et al. | 429/251 |
| 4,336,243 | 6/1982 | Sanvordeker et al. | 424/28 |
| 4,350,655 | 9/1982 | Hoge | 264/145 |
| 4,384,023 | 5/1983 | Okamura et al. | 428/338 |
| 4,405,688 | 9/1983 | Lowery et al. | 428/398 |
| 4,413,110 | 11/1983 | Kavesh et al. | 526/348.1 |
| 4,422,993 | 12/1983 | Smith et al. | 264/210.8 |
| 4,430,383 | 2/1984 | Smith et al. | 428/364 |
| 4,434,250 | 2/1984 | Kessler | 521/64 |
| 4,438,167 | 3/1984 | Schwarz | 428/138 |
| 4,438,175 | 3/1984 | Ashcraft et al. | 428/315 |
| 4,443,511 | 4/1984 | Worden et al. | 428/198 |
| 4,469,746 | 9/1984 | Weisman et al. | 428/289 |
| 4,472,328 | 9/1984 | Sugimoto et al. | 264/41 |
| 4,482,516 | 11/1984 | Bowman et al. | 264/127 |
| 4,490,431 | 12/1984 | Vitzthum et al. | 428/220 |

(List continued on next page.)

FOREIGN PATENT DOCUMENTS

| | | |
|---|---|---|
| 0191615 | 8/1986 | European Pat. Off. . |
| 0193318 | 9/1986 | European Pat. Off. . |
| 0281701 | 9/1988 | European Pat. Off. . |
| 42-13560 | 8/1967 | Japan . |
| 44-25240 | 10/1969 | Japan . |
| 60-89333 | 5/1985 | Japan ............... 428/910 |
| 61-141584 | 8/1986 | Japan . |

OTHER PUBLICATIONS

L. Leese, "Current Status Film Based Synthetic Papers", *TAAPI Proceedings* (1984), pp. 227–232.
E. Anczurowski et al, "New Papers for New Printers'"-*Chemtech* (May 1986) pp. 304 310.

*Primary Examiner*—William J. Van Balen
*Attorney, Agent, or Firm*—George D. Morris

[57] ABSTRACT

Microporous material substrate comprising (1) a matrix consisting essentially of linear ultrahigh molecular weight polyolefin, (2) a large proportion of finely divided water-insoluble siliceous filler, and (3) interconnecting pores is printed with printing ink.

62 Claims, No Drawings

U.S. PATENT DOCUMENTS

| | | | |
|---|---|---|---|
| 4,501,793 | 2/1985 | Sarada | 428/315.5 |
| 4,525,340 | 6/1985 | Lange et al. | 424/16 |
| 4,539,256 | 9/1985 | Shipman | 428/315.5 |
| 4,540,628 | 9/1985 | Oberdeck et al. | 428/336 |
| 4,545,950 | 10/1985 | Motooka et al. | 264/210.6 |
| 4,551,296 | 11/1985 | Kavesh et al. | 264/177 F |
| 4,564,488 | 1/1986 | Gerlach et al. | 264/41 |
| 4,585,604 | 4/1986 | Okuyama et al. | 264/41 |
| 4,588,633 | 5/1986 | Kono et al. | 428/220 |
| 4,599,264 | 7/1986 | Kauffman et al. | 428/264 |
| 4,600,533 | 7/1986 | Kono et al. | 428/220 |
| 4,613,441 | 9/1986 | Kohno et al. | 210/500.36 |
| 4,613,544 | 9/1986 | Burleigh | 428/315.5 |
| 4,613,643 | 9/1986 | Nakamura et al. | 524/426 |
| 4,620,955 | 11/1986 | Kono et al. | 264/41 |
| 4,620,956 | 11/1986 | Hamer | 264/145 |
| 4,626,252 | 12/1986 | Nishizawa et al. | 604/370 |
| 4,648,417 | 3/1987 | Johnson et al. | 134/105 |
| 4,707,404 | 11/1987 | Morishita et al. | 428/195 |
| 4,734,229 | 3/1988 | Johnson et al. | 264/40.6 |

PRINTED MICROPOROUS MATERIAL

This application is a continuation-in-part of application Ser. No. 42,404, filed Apr. 24, 1987, now abandoned.

The present invention is directed to printing upon microporous material substrate wherein the substrate is characterized by a matrix of essentially linear ultrahigh molecular weight polyolefin. a very large proportion of finely divided particulate siliceous filler, and a high void content, and to the printed microporous material.

Accordingly, one embodiment of the invention is printed microporous material comprising (a) a microporous material substrate having at least one surface and comprising: (1) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof, (2) finely divided particulate substantially water-insoluble siliceous filler distributed throughout the matrix, the filler constituting from about 50 percent to about 90 percent by weight of the microporous material substrate, and (3) a network of interconnecting pores communicating throughout the microporous material substrate. the pores constituting at least about 35 percent by volume of the microporous material substrate, and (b) printing ink on at least a portion of the surface in the form of indicia, one or more patterns, one or more designs, or a combination thereof.

Another embodiment of the invention is a method for producing printed microporous material comprising printing printing ink upon at least one surface of a microporous material substrate wherein the microporous material substrate comprises: (a) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof, (b) finely divided particulate substantially water-insoluble siliceous filler distributed throughout the matrix, the filler constituting from about 50 percent to about 90 percent by weight of the microporous material substrate, and (c) a network of interconnecting pores communicating throughout the microporous material substrate, the pores consisting at least about 35 percent by volume of the microporous material substrate.

There are many advantages in using the microporous material described herein as a printing substrate.

One such advantage is that the substrate need not be pretreated with any of the pretreatments customarily used to improve adhesion between the printing ink and the polyolefin substrate such as flame treatment, chlorination, or especially corona discharge treatment which is most commonly employed. This is surprising inasmuch as untreated polyolefins such as polyethylene and polypropylene cannot ordinarily be successfully printed because of a lack of adhesion between the polyolefin printing ink and the polyolefin substrate. The microporous material substrates used in the present invention may be pretreated to further improve ink-substrate adhesion, but commercially satisfactory results can ordinarily be attained without employing such methods.

Another advantage is that the microporous material substrates accept a wide variety of printing inks, including most organic solvent-based inks which are incompatible with water, organic solvent-based inks which are compatible with water, and water-based inks.

Yet another advantage is very rapid drying of most inks to the tack-free stage upon printing the microporous material substrates. This advantage is quite important in high speed press runs, in multicolor printing, and in reducing or even eliminating blocking of stacks or coils of the printed substrate.

A further advantage is the sharpness of the printed image that can be attained. This is especially important in graphic arts applications where fine lines, detailed drawings, or halftone images are to be printed. Halftone images printed on the microporous material substrate ordinarily exhibit high degrees of dot resolution.

Ink jet printing, especially when a water-based ink jet printing ink is used, is particularly suitable for printing bar codes on microporous material substrates. The resulting bars are sharp and of high resolution, which are important factors in reducing errors when the codes are read by conventional methods and equipment. The ink dries very rapidly when applied, thereby minimizing loss of bar resolution due to smearing in subsequent handling operations.

Microporous material substrate, after being printed with water-based printing ink, has been washed and dried using a conventional household washer and a conventional household drier. It was observed upon completion of the washing and drying operations that the printed colors held fast with no significant fading.

Inasmuch as ultrahigh molecular weight (UHMW) polyolefin is not a thermoset polymer having an infinite molecular weight, it is technically classified as a thermoplastic. However, because the molecules are essentially very long chains, UHMW polyolefin, and especially UHMW polyethylene, softens when heated but does not flow as a molten liquid in a normal thermoplastic manner. The very long chains and the peculiar properties they provide to UHMW polyolefin are believed to contribute in large measure to the desirable properties of the microporous material substrate.

As indicated earlier, the intrinsic viscosity of the UHMW polyethylene is at least about 18 deciliters/gram. In many cases the intrinsic viscosity is at least about 19 deciliters/gram. Although there is no particular restriction on the upper limit of the intrinsic viscosity, the intrinsic viscosity is frequently in the range of from about 18 and 39 deciliters/gram. An intrinsic viscosity in the range of from about 18 to about 32 deciliters/gram is preferred.

Also as indicated earlier the intrinsic viscosity of the UHMW polypropylene is at least about 6 deciliters/gram. In many cases the intrinsic viscosity is at least about 7 deciliters/gram. Although there is no particular restriction on the upper limit of the intrinsic viscosity, the intrinsic viscosity is often in the range of from about 6 to about 18 deciliters/gram. An intrinsic viscosity in the range of from about 7 to about 16 deciliters/gram is preferred.

As used herein and in the claims, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed. ASTM D 4020-81 is, in its entirety, incorporated herein by reference.

The nominal molecular weight of UHMW polyethylene is empirically related to the intrinsic viscosity of the polymer according to the equation:

$$M = 5.37 \times 10^4 \, [\eta]^{1.37}$$

where M is the nominal molecular weight and Inl is the intrinsic viscosity of the UHMW polyethylene expressed in deciliters/gram. Similarly, the nominal molecular weight of UHMW polypropylene is empirically related to the intrinsic viscosity of the polymer according to the equation:

$$M = 8.88 \times 10^4 \, [\eta]^{1.25}$$

where M is the nominal molecular weight and $[\eta]$ is the intrinsic viscosity of the UHMW polypropylene expressed in deciliters/gram.

The essentially linear ultrahigh molecular weight polypropylene is most frequently essentially linear ultrahigh molecular weight isotactic polypropylene. Often the degree of isotacicity of such polymer is at least about 95 percent, while preferably it is at least about 98 percent.

Sufficient UHMW polyolefin should be present in the matrix to provide its properties to the microporous material substrate. Other thermoplastic organic polymer may also be present in the matrix so long as its presence does not materially affect the properties of the microporous material substrate in an adverse manner. The amount of the other thermoplastic polymer which may be present depends upon the nature of such polymer. In general, a greater amount of other thermoplastic organic polymer may be used if the molecular structure contains little branching, few long sidechains, and few bulky side groups, than when there is a large amount of branching, many long sidechains, or many bulky side groups. For this reason, the preferred thermoplastic organic polymers which may optionally be present are low density polyethylene, high density polyethylene, poly(tetrafluoroethylene), polypropylene, copolymers of ethylene and propylene, copolymers of ethylene and acrylic acid, and copolymers of ethylene and methacrylic acid. If desired. all or a portion of the carboxyl groups of carboxyl-containing copolymers may be neutralized with sodium, zinc or the like. It is our experience that usually at least about 70 percent UHMW polyolefin, based on the weight of the matrix, will provide the desired properties to the microporous material. In most cases, however, it is preferred that the other thermoplastic organic polymer be substantially absent.

The finely divided substantially water-insoluble siliceous filler used in the present invention is particulate. As present in the microporous material substrate, the filler may be in the form of ultimate particles, aggregates of ultimate particles, or a combination of both. In most cases, at least about 90 percent by weight of the filler used in preparing the microporous material substrate has gross particle sizes in the range of from about 5 to about 40 micrometers as determined by use of a Model TAII Coulter counter (Coulter Electronics, Inc.) according to ASTM C 690-80 but modified by stirring the filler for 10 minutes in Isoton II electrolyte (Curtin Matheson Scientific, Inc.) using a four-blade, 4.445 centimeter diameter propeller stirrer. Preferably at least about 90 percent by weight of the filler has gross particle sizes in the range of from about 10 to about 30 micrometers. It is expected that the sizes of filler agglomerates will be reduced during processing of the ingredients to prepare the microporous material substrate. Accordingly, the distribution of gross particle sizes in the microporous material substrate may be smaller than in the raw filler itself. ASTM C 690-80 is, in its entirety, incorporated hereby by reference.

Examples of suitable siliceous fillers include silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. In addition to the siliceous fillers other finely divided particulate substantially water-insoluble fillers may also be employed. Example of such optional fillers include carbon black, charcoal, graphite, titanium oxide, iron oxide, copper oxide, zinc oxide, antimony oxide, zirconia, magnesia, alumina, molybdenum disulfide, zinc sulfide, barium sulfate, strontium sulfate, calcium carbonate, and magnesium carbonate.

Silica and the clays are the preferred siliceous fillers. Of the silicas, precipitated silica, silica gel, or fumed silica is most often used.

The particularly preferred finely divided particulate substantially water-insoluble siliceous filler is precipitated silica. Although both are silicas, it is important to distinguish precipitated silica from silica gel inasmuch as these different materials have different properties. Reference in this regard is made to R. K. Iler, *The Chemistry of Silica*, John Wiley & Sons, New York (1979). Library of Congress Catalog No. QD 181.S6144, the entire disclosure of which is incorporate herein by reference. Note especially pages 15–29, 172–176, 218–233, 364–365, 462–465, 554–564, and 578–579. Silica gel is usually produced commercially at low pH by acidifying an aqueous solution of a soluble metal silicate, typically sodium silicate. with acid. The acid employed is generally a strong mineral acid such as sulfuric acid or hydrochloric acid although carbon dioxide is sometimes used. Inasmuch as there is essentially no difference in density between gel phase and the surrounding liquid phase while the viscosity is low, the gel phase does not settle out, that is to say, it does not precipitate. Silica gel, then. may he described as a non-precipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the the order of 100 parts of water per part of silica by weight, although the highly hydrated forms are only rarely used in the present invention.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acid may be used, including the mineral acids, but the preferred acid is carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Many different precipitated silicas may be employed in the present invention, but the preferred precipitated silicas are those obtained by precipitation from an aqueous solution of sodium silicate using a suitable acid such as sulfuric acid, hydrochloric acid, or carbon dioxide. Such precipitated silicas are themselves known and processes for producing them are described in detail in the U.S. Pat. No. 2,940,830 and in West German Offenlegungsschrift No. 35 45 615, the entire disclosures of which are incorporated herein by reference, including especially the processes for making precipitated silicas and the properties of the products.

In the case of the preferred filler, precipitated silica, the average ultimate particle size (irrespective of whether or not the ultimate particles are agglomerated) is less than about 0.1 micrometer as determined by transmission electron microscopy. Often the average ultimate particle size is less than about 0.05 micrometer. Preferably the average ultimate particle size of the precipitated silica is less than about 0.03 micrometer.

The finely divided particulate substantially water-insoluble siliceous filler constitutes from about 50 to 90 percent by weight of the microporous material substrate. Frequently such filler constitutes from about 50 to about 85 percent by weight of the microporous material substrate. From about 60 percent to about 80 percent by weight is preferred.

Minor amounts, usually less than about 5 percent by weight, of other materials used in processing such as lubricant, processing plasticizer, organic extraction liquid, surfactant, water, and the like, may optionally also be present. Yet other materials introduced for particular purposes may optionally be present in the microporous material substrate in small amounts, usually less than about 15 percent by weight. Examples of such materials include antioxidants, ultraviolet light absorbers, flame retardants, reinforcing fibers such as chopped glass fiber strand, dyes, pigments, and the like. The balance of the microporous material substrate, exclusive of filler and any impregnant applied for one or more special purposes is essentially the thermoplastic organic polymer.

On an impregnant-free basis, pores constitute at least about 35 percent by volume of the microporous material substrate. In many instances the pores constitute at least about 60 percent by volume of the microporous material substrate. Often the pores constitute from at least about 35 percent to about 95 percent by volume of the microporous material. From about 60 percent to about 75 percent by volume is preferred. As used herein and in the claims, the porosity (also known as void volume) of the microporous material substrate, expressed as percent by volume, is determined according to the equation:

$$\text{Porosity} = 100[1 - d_1/d_2]$$

where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the same is determined using a Quantachrome stereopycnometer (Quantachrome Corp.) in accordance with the accompanying operating manual.

The volume average diameter of the pores of the microporous material substrate is determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from about 138 kilopascals absolute to about 227 megapascals absolute). If about 2 percent or less of the total intruded volume occurs at the low end (from about 138 to about 250 kilopascals absolute) of the high pressure range, the volume average pore diameter is taken as twice the volume average pore radius determined by the porosimeter. Otherwise, an additional scan is made in the low pressure range (from about 7 to about 165 kilopascals absolute) and the volume average pore diameter is calculated according to the equation:

$$d = 2\left(\frac{v_1 r_1}{w_1} + \frac{v_2 r_2}{w_2}\right) \bigg/ \left(\frac{v_1}{w_1} + \frac{v_2}{w_2}\right)$$

where $d$ is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. Generally the volume average diameter of the pores is in the range of from about 0.02 to about 50 micrometers. Very often the volume average diameter of the pores is in the range of from about 0.04 to about 40 micrometers. From about 0.05 to about 30 micrometers is preferred.

In the course of determining the volume average pore diameter of the above procedure, the maximum pore radius detected is sometimes noted. This is taken from the low pressure range scan if run; otherwise it is taken from the high pressure range scan. The maximum pore diameter is twice the maximum pore radius.

Microporous material substrate may be produced according to the general principles and procedures of U.S. Pat. No. 3,351,495, the entire disclosure of which is incorporated herein by reference, including especially the processes for making microporous materials and the properties of the products.

Preferably filler, thermoplastic organic polymer powder, processing plasticizer and minor amounts of lubricant and antioxidant are mixed until a substantially uniform mixture is obtained. The weight ratio of filler to polymer powder employed in forming the mixture is essentially the same as that of the microporous material substrate to be produced. The mixture, together with additional processing plasticizer, is introduced to the heated barrel of a screw extruder. Attached to the extruder is a sheeting die. A continuous sheet formed by the die is forwarded without drawing to a pair of heated calender rolls acting cooperatively to form continuous sheet of lesser thickness than the continuous sheet exiting from the die. The continuous sheet from the calender then passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet. which is microporous material substrate. is passed to a take-up roll.

The processing plasticizer has little solvating effect on the thermoplastic organic polymer at 60° C., only a moderate solvating effect at elevated temperatures on the order of about 100° C., and a significant solvating effect at elevated temperatures on the order of about 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Preferred are those oils which have a pour point of less than 22° C. according to ASTM D 97-66 (reapproved 1978). Particularly preferred are oils having a pour point of less than 10° C. Examples of suitable oils include Shellflex ® 412 and Shellflex ® 371 oil (Shell Oil Co.) which are solvent refined and hydrotreated oils derived from naphthenic crude. ASTM D 2226-82 and ASTM D 97-66 (reapproved 1978) are, in the entireties, incorporated herein by reference. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane. 1,1,1-trichloroethane, 1,1,2-trichloroethane, methylene chloride, chloroform, isopropyl alcohol, diethyl ether and acetone.

In the above described process for producing microporous material substrate, extrusion and calendering are facilitated when the substantially water-insoluble filler carries much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of the filler itself is in the range of from about 20 to about 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from about 25 to 350 square meters per gram. ASTM C 819-77 is, in its entirety, incorporated herein by reference.

Inasmuch as it is desirable to essentially retain the filler in, the microporous material substrate, it is preferred that the substantially water-insoluble filler be substantially insoluble in the processing plasticizer and substantially insoluble in the organic extraction liquid when microporous material substrate is produced by the above process.

The residual processing plasticizer content is usually less than 5 percent by weight of the microporous sheet substrate and this may be reduced even further by additional extractions using the same or a different organic extraction liquid.

Pores constitute from about 35 to about 80 percent by volume of the microporous material substrate when made by the above-described process. In many cases the pores constitute from about 60 to about 75 percent by volume of the microporous material substrate.

The volume average diameter cf the pores of the microporous material substrate when made by the above-described process, is usually in the range of from about 0.02 to about 0.5 micrometers. Frequently the average diameter of the pores is in the range of from about 0.04 to about 0.3 micrometers. From about 0.05 to about 0.25 micrometers is preferred.

The microporous material produced by the above-described process may be used as a substrate for printing. However, it may optionally be stretched and the stretched microporous material used as a substrate for printing. When such stretching is employed, the product of the above-described process may be regarded as an intermediate product.

It will be appreciated that the stretching both increases the void volume of the material and induces regions of molecular orientation in the ultrahigh molecular weight (UHMW) polyolefin. As is well known in the art, many of the physical properties of molecularly oriented thermoplastic organic polymer, including tensile strength, tensile modulus, Young's modulus, and others, differ considerably from those of the corresponding thermoplastic organic polymer having little or no molecular orientation. Although it is not desired to be bound by any theory, it is believed that the properties of the UHMW polyolefin, the regions of molecular orientation, the high levels of filler loading, the high degrees of porosity cooperate to provide many of the desirable properties characteristic of the stretched microporous material substrates used in the present invention.

Stretched microporous material substrate may be produced by stretching the intermediate product in at least one stretching direction above the elastic limit. Usually the stretch ratio is at least about 1.5. In many cases the stretch ratio is at least about 1.7. Preferably it is at least about 2. Frequently the stretch ratio is in the range of from about 1.5 to about 15. Often the stretch ratio is in the range of from about 1.7 to about 10. Preferably the stretch ratio is in the range of from about 2 to about 6. As used herein, the stretch ratio is determined by the formula:

$$S = L_2/L_1$$

where S is the stretch ratio, $L_1$ is the distance between two reference points located on the intermediate product and on a line parallel to the stretching direction, and $L_2$ is the distance between the same two reference points located on the stretched microporous material.

The temperatures at which stretching is accomplished may vary widely. Stretching may be accomplished at about ambient room temperature, but usually elevated temperatures are employed. The intermediate product may be heated by any of a wide variety of techniques prior to, during, and/or after stretching. Examples of these techniques include radiative heating such as that provided by electrically heated or gas fired infrared heaters. convective heating such as that provided by recirculating hot air, and conductive heating such as that provided by contact with heated rolls. The temperatures which are measured for temperature control purposes may vary according to the apparatus used and personal preference. For example, temperature-measuring devices may be placed to ascertain the temperatures of the surfaces of infrared heaters, the interiors of infrared heaters, the air temperatures of points between the infrared heaters and the intermediate product, the temperatures of circulating hot air at points within the apparatus, the temperature of hot air entering or leaving the apparatus, the temperatures of the surfaces of rolls used in the stretching process, the temperature of heat transfer fluid entering or leaving such rolls, or film surface temperatures. In general, the temperature or temperatures are controlled such that the intermediate product is stretched about evenly so that the variations, if any, in film thickness of the stretched microporous material are within acceptable limits and so that the amount of stretched microporous material outside of those limits is acceptably low. It will be apparent that the temperatures used for control purposes may or may not be close to those of the intermediate product itself since they depend upon the nature of the apparatus used, the locations of the temperature-measuring devices, and the identities of the substances or objects whose temperatures are being measured.

In view of the locations of the heating devices and the line speeds usually employed during stretching, gradients of varying temperatures may or may not be present through the thickness of the intermediate product. Also because of such line speeds, it is impracticable to measure these temperature gradients. The presence of gradients of varying temperatures, when they occur, makes it unreasonable to refer to a singular film temperature. Accordingly, film surface temperatures, which can be measured, are best used for characterizing the thermal condition of the intermediate product. These are ordinarily about the same across the width of the intermediate product during stretching although they may be intentionally varied, as for example, to compensate for intermediate product having a wedge-shaped cross-section across the sheet. Film surface temperatures along the length of the sheet may be about the same or they may be different during stretching.

The film surface temperatures at which stretching is accomplished may vary widely, but in general they are such that the intermediate product is stretched about evenly, as explained above. In most cases, the film surface temperatures during stretching are in the range of from about 20° C. to about 220° C. Often such temperatures are in the range of from about 50° C. to about 200° C. From about 75° C. to about 180° C. is preferred.

Stretching may be accomplished in a single step or a plurality of steps as desired. For example, when the intermediate product is to be stretched in a single direction (uniaxial stretching), the stretching may be accomplished by a single stretching step or a sequence of stretching steps until the desired final stretch ratio is attained. Similarly, when the intermediate product is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more uniaxial stretching steps in another direction. Biaxial stretching steps where the intermediate product is stretched simultaneously in two directions and uniaxial stretching steps may be conducted in sequence in any order. Stretching in more than two directions is within contemplation. It may be seen that the various permutationes of steps are quite numerous. Other steps, such as cooling, heating, sintering, annealing, reeling, unreeling, and the like, may optionally be included in the overall process as desired.

Various types of stretching apparatus are well known and may be used to accomplish stretching of the intermediate product. Uniaxial stretching is usually accomplished by stretching between two rollers wherein the second or downstream roller rotates at a greater peripheral speed than the first or upstream roller. Uniaxial stretching can also be accomplished on a standard tentering machine. Biaxial stretching may be accomplished by simultaneously stretching in two different directions on a tentering machine. More commonly, however, biaxial stretching is accomplished by first uniaxially stretching between two differentially rotating rollers as described above, followed by either uniaxially stretching in a different direction using a tenter machine or by biaxially stretching using a tenter machine. The most common type of biaxial stretching is where the two stretching directions are approximately at right angles to each other. In most cases where continuous sheet is being stretched, one stretching direction is at least approximately parallel to the long axis of the sheet (machine direction) and the other stretching direction is at least approximately perpendicular to the machine direction and is in the plane of the sheet (transverse direction).

After stretching has been accomplished, the microporous material may optionally be sintered, annealed, heat set and/or otherwise heat treated. During these optional steps, the stretched microporous material is usually held under tension so that it will not markedly shrink at the elevated temperatures employed, although some relaxation amounting to a small fraction of the maximum stretch ratio is frequently permitted.

Following stretching and any heat treatments employed, tension is released from the stretched microporous material after the microporous material has been brought to a temperature at which, except for a small amount of elastic recovery amounting to a small fraction of the stretch ratio, it is essentially dimensionally stable in the absence of tension. Elastic recovery under these conditions usually does not amount to more than about 10 percent of the stretch ratio.

The stretched microporous material may then be further processed as desired. Examples of such further processing steps include reeling, cutting, stacking, treatment to remove residual processing plasticizer or extraction solvent, impregnation with various materials, fabrication into shapes for various end uses, and lamination to one or more backings of reinforcing fibers such as woven fabrics, knitted fabrics, or mats.

In all cases, the porosity of the stretched microporous material is, unless impregnated after stretching, greater than that of the intermediate product. On an impregnant-free basis, pores usually constitute more than 80 percent by volume of the stretched microporous material. In many instances the pores constitute at least about 85 percent by volume of the stretched microporous material. Often the pores constitute from more than 80 percent to about 95 percent by volume of the stretched microporous material. From about 85 percent to about 95 percent by volume is preferred.

Generally the volume average diameter of the pores of the stretched microporous material is in the range of from 0.6 to about 50 micrometers. Very often the volume average diameter of the pores is in the range of from about 1 to about 40 micrometers. From about 2 to about 30 micrometers is preferred.

Microporous material substrate, whether or not stretched, may be printed with a wide variety of printing inks using a wide variety of printing processes. Both the printing inks and the printing processes are themselves conventional.

One class of printing processes that can be used is typographic printing where ink is placed on macroscopically raised areas of the printing plate. Examples of typographic processes include rubber-stamp printing, letterpress printing, flexography, and letterset printing which is also known as dry offset printing and as offset letterpress printing.

Another class of printing suitable for use is intaglio printing. also known as gravure printing, where ink is placed on depressed areas of the printing plate.

Yet another class of printing processes suitable for use is planographic printing where ink is placed on localized regions of a printing plate that is either smooth or contains only microscopically raised areas. A subclass of particular interest is lithography, which includes several variations. Conventional lithography uses oil-based inks while reverse lithography uses water-based inks. In direct lithography (whether conventional or reverse), printing ink is applied to the substrate directly from the lithographic printing plate. In offset lithography (whether conventional or reverse), the printing ink is transferred first from the lithographic printing plate to a printing blanket and then from the printing blanket to the substrate. Other types of planographic printing include collotype printing, autotype printing, hectograph printing, and xerography.

Another class of printing processes that can be used is stencil printing, including screen printing and mimeograph printing.

Various miscellaneous printing processes that can be used include typewriting and dot matrix printing, both of which may be considered as typographic in principle. Another example of a miscellaneous printing process is ink jet printing.

Of the printing processes, lithography and letterpress printing are most often used. Of the lithographic processes, offset lithography is preferred, especially when the lithography is conventional lithography.

The microporous substrate is suitable for line printing, halftone printing, and continuous tone printing.

When more than a few copies are to be produced, printing is usually accomplished using a printing press. The three general types commonly used for printing flat substrates are the platen press, the flat-bed cylinder press, and the rotary press. The rotary press, which may be sheet fed or web fed. is most often used.

There are many differences in printing inks, some physical and some chemical. Consequently there is a wide variety of systems for classifying inks depending upon which similarities and differences it is desired to emphasize. Most inks used for printing are liquids or pastes, that is, the vehicle before drying contains a liquid. There are a few exceptions such as xerographic printing ink also known as toner, which is dry. Oil-based and most organic solvent based inks are not compatible with water, whereas water-based inks are not ordinarily compatible with oil. Inks usually dry by evaporation of liquid, by adsorption of liquid into the substrate, by crosslinking of the binder, by cooling or by a combination of two or more of these. Other systems of classification are. based on the type of binder, such as rubber-based, drying oil based, non-drying oil based, natural resin-based, gilsonite-based, asphaltic-based, synthetic resin-based, and the like. Yet another classification system is based upon viscosity of the ink. Still another is based upon the types of colorant which may be present, such as pigment-based, toner-based, dye-based, pigment and dye based. clear, and the like. Other systems are based upon the printing processes employed for deposition of the ink on the substrate.

In keeping with customary usage, the term "printing ink" is used herein with reference to the ink composition employed in printing and with reference to the printed composition on the substrate, whether before drying or after drying, partial drying, or hardening. The correct usage will be obvious from the context or expressly stated.

Printing processes, printing equipment, and printing inks have been extensively discussed and documented. Examples of reference works that may be consulted include L. M. Larsen, *Industrial Printing Ink, Reinhold Publishing Corp.*, (1962); Kirk-Othmer, *Encyclopedia of Chemical Technology*, 2d Ed., John Wiley & Sons, Inc., Vol. 11, pages 611–632 (1966) and Vol. 16, pages 494–546 (1968); and R. N. Blair, *The Lithographers Manual*, The Graphic Arts Technical Foundation, Inc., 7th Ed. (1983).

The invention is further described in conjunction with the following examples which are to be considered illustrative rather than limiting.

EXAMPLES

Microporous Material Substrate Formation

The preparation of the above described materials is illustrated. by the following descriptive examples. Processing oil was used as the processing plasticizer. Silica, polymer, lubricant and antioxidant in the amount specified in Table I were placed in a high intensity mixer and mixed at high speed for 30 seconds to thoroughly blend the dry ingredients. The processing oil needed to formulate the batch was pumped into the mixer over a period of 2–3 minutes with low speed agitation. After the completion of the processing oil addition a 2 minute low speed mix period was used to distribute the processing oil uniformly throughout the mixture.

TABLE I

| | Formulations | | | | | | |
|---|---|---|---|---|---|---|---|
| | Example | | | | | | |
| Ingredient | 1 & 1A | 2 | 3 | 4 | 5 | 6 | 7 |
| UHMWPE (1), kg | 5.67 | 9.98 | 4.25 | 8.57 | 6.12 | 9.98 | 3 |
| Polypropylene (2), kg | 0 | 0 | 1.42 | 0 | 0 | 0 | 0 |
| Precipitated Silica (3), kg | 19.96 | 19.96 | 19.96 | 19.96 | 13.02 | 9.98 | 19.96 |
| Silica Gel, kg | 0 | 0 | 0 | 0 | 6.49 | 0 | 0 |
| Clay, kg | 0 | 0 | 0 | 9.98 | 0 | 0 | 0 |
| Lubricant (4), g | 100 | 100 | 100 | 100 | 100 | 50 | 100 |
| Antioxidant (5), g | 100 | 100 | 100 | 100 | 100 | 50 | 100 |
| Processing Oil (6), kg | | | | | | | |
| in Batch | 31.21 | 31.21 | 31.21 | 37.58 | 33.44 | 16.89 | 31.72 |
| at Extruder | 13.61 | 41.59 | 30.39 | 28.60 | ~14 | 18.72 | 13.61 |

(1) UHMWPE = Ultrahigh Molecular Weight Polyethylene, Himont 1900, Himont, U.S.A., Inc.
(2) Profax ® 6801, Himont U.S.A., Inc.
(3) HiSil ® SBG, PPG Industries, Inc.
(4) Petrac ® CZ81, Desoto, Inc., Chemical Speciality Division
(5) Irganox ® B-215, Ciba-Geigy Corp.
(6) Shellflex ® 412, Shell Chemical Co.

The batch was then conveyed to a ribbon blender where usually it was mixed with up to two additional batches of the same composition. Material was fed from the ribbon blender to a twin screw extruder by a variable rate screw feeder. Additional processing oil was added via a metering pump into the feed throat of the extruder. The extruder mixed and melted the formulation and extruded it through a 76.2 centimeter × 0.3175 centimeter slot die. The extruded sheet was then calendered. A description of one type of calender that may be used may be found in the U.S. Pat. No. 4,734,229, the entire disclosure of which is incorporated herein by reference, including the structures of the devices and their modes of operation. Other calenders of different design may alternatively be used; such calenders and their modes of operation are well known in the art. The hot, calendered sheet was then passed around a chill roll to cool the sheet. The rough edges of the cooled calendered sheet were trimmed by rotary knives to the desired width.

The oil filled sheet was conveyed to the extractor unit where it was contacted by both liquid and vaporized 1,1,2-trichloroethylene (TCE). The sheet was transported over a series of rollers in a serpentine fashion to provide multiple, sequential vapor/liquid/vapor contacts. The extraction liquid in the sump was maintained at a temperature of 65°–88° C. Overflow from the sump of the TCE extractor was returned to a still which recovered the TCE and the processing oil for reuse in the process. The bulk of the TCE was extracted from the sheet by steam as the sheet was passed through a second extractor unit. A description of these types of extractors may be found in European Patent Application Publication No. EP 0 191 615, the entire disclosure of which is incorporated herein by reference, including especially the structures of the devices and their modes of operation. The sheet was dried by radiant heat and convective air flow. The dried sheet was wound on cores to provide roll stock for further processing.

The microporous sheets, as well as the hereinafter described biaxially stretched microporous sheets produced therefrom, were tested for various physical properties. Table II identifies the properties with the methods used for their determination. The various ASTM test methods and Method 502 C, referenced in Table II, are, in their entireties, incorporated herein by reference. The results of physical testing of the unstretched microporous sheets are shown in Table III.

Property values indicated by MD (machine direction) were obtained on samples whose major axis was oriented along the length of the sheet. TD (transverse direction; cross machine direction) properties were obtained from samples whose major axis was oriented across the sheet.

TABLE II

| | Physical Test Methods |
|---|---|
| Property | Test Method |
| Tensile Strength | ASTM D 412-83. |
| Elongation | |
| Porosity | As described in the text above. |
| Matrix Tensile Strength | Tensile Strength determined in accordance with ASTM D 412-83 multiplied by the quantity 100/(100-Porosity). |
| Tear Strength, Die C | ASTM D 624-81. |
| Processing Oil Content | Method 502 C in "Standard Methods for the Examination of Water and Wastewater", 14th Ed., APHA-AWWA-WPCF (1975). |
| Maximum Pore Diameter | Mercury Porosimetry, as described in the text above. |
| Volume Average Pore Diameter | Mercury Porosimetry, as described in the text above. |
| Gurley Air Flow | ASTM D 726-58 (reapproved 1971), Method A. |
| Mullens Hydrostatic Resistance | |
| MVTR (Moisture Vapor Transmission Rate) | ASTM E 96-80. |
| Methanol Bubble Pressure | ASTM F 316-80, using methanol. |
| Maximum Limiting Pore Diameter | ASTM F316-80, using methanol where $c\gamma = 22.34$ $(\mu m)(kPa)$. |
| Heat Shrinkage | ASTM D 1204-84, using 15.24 cm × 20.32 cm sample, 1 hr at 100° C. |
| Strip Tensile Strength and Elongation | ASTM D 828-60. |
| Breaking Factor and Elongation | ASTM D 882-83. |

TABLE III

Physical Properties of Microporous Sheet

| Example No. | 1 | 1A | 2 | 3 | 4 | 5 | 6 | 7 |
|---|---|---|---|---|---|---|---|---|
| Thickness, mm | 0.229 | 0.279 | 0.279 | 0.229 | 0.381 | 0.483 | 0.254 | 0.229 |
| Matrix Tensile Strength, MPa | | | | | | | | |
| MD | 23.82 | 25.42 | 34.33 | 25.66 | 27.79 | 29.21 | 70.47 | 20.35 |
| TD | 9.94 | 12.00 | 14.91 | 10.38 | 19.05 | 15.55 | 26.39 | 5.97 |
| Elongation at break, % | | | | | | | | |
| MD | 250 | 375 | 279 | 227 | | | 14 | 110 |
| TD | 108 | 339 | 140 | 112 | 546 | 470 | 482 | 214 |
| Tear Strength, kN/m | | | | | | | | |
| MD | 36.25 | 35.03 | 61.47 | 47.81 | 56.39 | 57.09 | 93.34 | 24.52 |
| TD | 18.04 | 21.19 | 39.93 | 23.12 | 39.75 | 32.22 | 89.66 | 7.36 |
| Porosity, vol % | 71 | 71 | 66 | 68 | 57.9 | 59.3 | 58.9 | 77 |
| Processing Oil Content, wt % | 4.1 | 4.1 | 2.7 | 2.4 | | | | 2.7 |
| Maximum Pore Diameter, μm | 0.86 | | 0.30 | 0.28 | 1.34 | 6.11 | 0.16 | |
| Volume Average Pore Diameter, μm | 0.11 | | 0.065 | 0.069 | 0.099 | 0.111 | 0.12 | |
| Gurley Air Flow, sec/100 cc | 904 | | 1711 | 955 | | | 4098 | 422 |

Biaxial Stretching of Microporous Sheet

Portions of the microporous materials produced in Examples 1-3 were unwound from cores and biaxially stretched by first uniaxially stretching in the machine direction using a single stage roll-to-roll machine direction stretching (MDS) unit and then essentially uniaxially stretching in the transverse direction using a moving clip tenter frame as a transverse direction stretching (TDS) unit. A preheat roll was employed with the MDS unit to heat the sheet prior to stretching. In the TDS unit, the sheet was heated by infrared radiant heaters. The Preheat and Stretch I Zones of the TDS unit each contained both upper and lower banks of such heaters. The upper banks were located about 10.16 centimeters above the intermediate product while the lower banks were located about 15.24 centimeters below the intermediate product. Electrical power to the heaters of each lower bank was controlled by an on-off controller in response to the difference between a set point and the signal provided by a thermocouple mounted in one heater of the bank. Autotransformers were used to adjust electrical power to the heaters of the upper banks. The Stretch II, Stretch III, Sinter I, and Sinter II Zones each contained upper banks of infrared radiant heaters located about 10.16 centimeters above the intermediate product. There were no lower banks in these zones. Electrical power to the heaters of each upper bank was controlled as described in respect of the heaters of each lower bank in the Preheat and Stretch I Zones. For a description of a typical TDS unit, see FIG. 2 and column 2, lines 43-69, of U.S. Pat. No. 2,823,421, the entire disclosure of which is incorporated herein by reference.

The MDS stretch ratio was varied by controlling the relative peripheral speeds of the feed rolls and the take-off rolls of the MDS unit. The chain track positions in the tenter frame were set to achieve the desired stretch ratio and then to essentially maintain that stretch ratio during sintering. For each of the Examples 8-29, the settings of one of the last four vertical columns in Table IV were employed. The correct column may be ascertained by matching up the TD stretch ratio of the example with the final stretch ratio of the column.

TABLE IV

Transverse Direction Stretching

| Zone | Cumulative Distance from Beginning of Oven, meters | Approximate Transverse Stretch Ratio | | | |
|---|---|---|---|---|---|
| Preheat | 0 | 1 | 1 | 1 | 1 |
| Stretch I | 2.794 | 1 | 1 | 1 | 1 |
| Stretch II | 4.318 | 1.33 | 1.44 | 1.65 | 1.87 |
| Stretch III | 8.890 | 2.31 | 2.75 | 3.62 | 4.49 |
| Sinter I | 9.779 | 2.5 | 3 | 4 | 5 |
| Sinter II | 11.430 | 2.5 | 3 | 4 | 5 |
| | 13.716 | 2.5 | 3 | 4 | 5 |

The microporous sheet stock of Examples 1-3 was fed over the preheat roll of the MDS unit which was heated to the temperature indicated in Tables V-VII. The sheet was then stretched to the indicated stretch ratio by maintaining the relative peripheral speeds of the second and first stretch rolls at essentially the same ratio as the stretch ratio. The line speed given in Tables V-VII is the output speed of the MDS unit and the machine direction speed of the TDS unit. The linear feed rate from the roll stock of microporous material to the MDS unit was set at a value given by the line speed divided by the MDS stretch ratio. Thus, with a line speed of 24 m/min and a MDS stretch ratio of 2, the linear feed rate from the roll stock of the MDS unit would be 12 m/min. The properties of several representative examples of biaxially stretched sheets are given in Tables V-VII.

TABLE V

Properties of Biaxially Stretched Microporous Sheets Produced from Microporous Sheet of Example 1

| Example No. | 8 | 9 | 10 | 11 | 12 | 13 | 14 | 15 | 16 |
|---|---|---|---|---|---|---|---|---|---|
| Thickness, mm | 0.178 | 0.152 | 0.127 | 0.076 | 0.076 | 0.102 | 0.127 | 0.102 | 0.076 |
| Stretch Ratio | | | | | | | | | |
| MD | 2 | 2 | 2 | 2 | 3 | 3 | 3 | 3 | 3 |
| TD | 3 | 3 | 4 | 5 | 3 | 3 | 3 | 3 | 4 |
| Line Speed m/min | 48.8 | 24.4 | 24.4 | 24.4 | 24.4 | 24.4 | 24.4 | 24.4 | 24.4 |
| MDS Preheat Temp., °C. | 79 | 79 | 79 | 79 | 79 | 79 | 79 | 79 | 79 |
| TDS Average Zonal Set Point Temps., °C. | | | | | | | | | |
| Preheat (lower banks) | 149 | 177 | 177 | 149 | 149 | 149 | 177 | 149 | 177 |
| Stretch I (lower banks) | 149 | 177 | 177 | 149 | 149 | 149 | 177 | 149 | 177 |
| Stretch II | 189 | 171 | 171 | 189 | 189 | 189 | 171 | 189 | 171 |
| Stretch III | 149 | 142 | 142 | 149 | 149 | 149 | 142 | 149 | 142 |
| Sinter I | 149 | 144 | 144 | 149 | 149 | 149 | 144 | 149 | 144 |
| Sinter II | 204 | 227 | 227 | 204 | 149 | 204 | 227 | 260 | 227 |
| Weight, g/m$^2$ | 27 | 24 | 17 | 14 | 14 | 10 | 14 | 14 | 10 |
| Porosity, vol % | 91 | 90 | 92 | 90 | 89 | 93 | 93 | 93 | 91 |
| Matrix Tensile Strength, MPa | | | | | | | | | |
| MD | 53.70 | 32.96 | 40.25 | 25.30 | 29.52 | 62.74 | 67.77 | 41.96 | 56.69 |
| TD | 40.14 | 29.30 | 65.76 | 46.54 | 61.99 | 45.41 | 43.93 | 57.62 | 55.77 |
| Elongation at break, % | | | | | | | | | |
| MD | 57 | 56 | 60 | 67 | 26 | 23 | 34 | 18 | 33 |
| TD | 27 | 41 | 13 | 9 | 23 | 27 | 30 | 31 | 12 |
| Tear Strength, kN/m | | | | | | | | | |
| MD | 9.28 | 5.78 | 7.01 | 3.85 | 2.28 | 5.08 | 6.30 | 5.60 | 5.08 |
| TD | 4.90 | 4.90 | 7.01 | 8.23 | 7.53 | 1.93 | 4.38 | 4.55 | 4.73 |
| Gurley Air Flow, sec/100 cc | 47 | 45 | 40 | 29 | 32 | 28 | 37 | 28 | 36 |
| Mullens Hydrostatic, kPa | 483 | 434 | 490 | 448 | 476 | 503 | 496 | 434 | 510 |
| MVTR, g/m$^2$ day | 935 | | | | | | | 963 | |
| Methanol Bubble Point Pressure, kPa | 290 | 276 | 296 | 234 | 145 | 276 | 324 | 55 | 317 |
| Maximum Limiting Pore Diameter, μm | 0.077 | 0.081 | 0.075 | 0.095 | 0.154 | 0.081 | 0.069 | 0.404 | 0.070 |
| Maximum Pore Diameter, μm | | | | | | | 155 | | |
| Volume Average Pore Diameter, μm | | | | | | | 17.92 | | |
| Heat Shrinkage after 1 hr at 100° C., % | | | | | | | | | |
| MD | 19.0 | | 9.4 | 12.0 | | 19.3 | 24.1 | 21.2 | |
| TD | 23.2 | | 22.5 | 28.3 | | 25.7 | 29.1 | 30.8 | |

The biaxially stretched microporous sheet of Example 14 was examined by scanning electron microscopy at a magnification of 430X. A section taken in a plane perpendicular to the sheet surface (viz., looking into the thickness) and along the machine direction showed substantial pore elongation. A section taken in a plane perpendicular to the sheet surface and along the transverse direction showed pore elongation which was not as pronounced as along the machine direction. A view of the sheet surface (not sectioned) showed that large void structures were not as numerous as in views of either of the sections looking into the thickness.

TABLE VI

Properties of Biaxially Stretched Microporous Sheets Produced from Microporous Sheet of Example 2

| Example No. | 17 | 18 | 19 | 20 | 21 | 22 | 23 | 24 | 25 |
|---|---|---|---|---|---|---|---|---|---|
| Thickness, mm | 0.203 | 0.152 | 0.178 | 0.127 | 0.152 | 0.127 | 0.102 | 0.076 | 0.178 |
| Stretch Ratio | | | | | | | | | |
| MD | 2 | 2 | 2 | 2 | 2 | 3 | 3 | 3 | 3 |
| TD | 2.5 | 3 | 3 | 3 | 4 | 3 | 3 | 3 | 4 |
| Line Speed | | | | | | | | | |

TABLE VI-continued

Properties of Biaxially Stretched Microporous Sheets Produced from Microporous Sheet of Example 2

| Example No. | 17 | 18 | 19 | 20 | 21 | 22 | 23 | 24 | 25 |
|---|---|---|---|---|---|---|---|---|---|
| m/min | 24.4 | 24.4 | 15.2 | 24.4 | 15.2 | 24.4 | 15.2 | 24.4 | 15.2 |
| MDS Preheat Temp., °C. | 104 | 104 | 121 | 79 | 121 | 104 | 121 | 79 | 121 |
| TDS Average Zonal Set Point Temps., °C. | | | | | | | | | |
| Preheat (lower banks) | 177 | 177 | 149 | 149 | 149 | 177 | 149 | 149 | 149 |
| Stretch I (lower banks) | 177 | 177 | 149 | 149 | 149 | 177 | 149 | 149 | 149 |
| Stretch II | 171 | 171 | 188 | 188 | 188 | 171 | 188 | 188 | 188 |
| Stretch III | 142 | 142 | 144 | 149 | 144 | 142 | 144 | 149 | 144 |
| Sinter I | 144 | 144 | 200 | 149 | 144 | 144 | 144 | 149 | 144 |
| Sinter II | 227 | 227 | 255 | 316 | 255 | 227 | 255 | 316 | 255 |
| Weight, g/m² | 44 | 24 | | | 24 | 17 | | 14 | 31 |
| Porosity, vol % | 86 | 90 | | | 90 | 92 | | 90 | 90 |
| Matrix Tensile Strength, MPa | | | | | | | | | |
| MD | 52.94 | 61.50 | | | 36.61 | 96.18 | | 73.91 | 37.51 |
| TD | 44.47 | 67.98 | | | 109.49 | 54.38 | | 75.01 | 117.21 |
| Elongation at break, % | | | | | | | | | |
| MD | 58 | 54 | 161 | 41 | 87 | 31 | 13 | 19 | 111 |
| TD | 51 | 39 | 15 | 16 | 9 | 42 | 16 | 16 | 7 |
| Tear Strength, kN/m | | | | | | | | | |
| MD | 20.31 | 12.61 | 17.51 | 6.13 | 13.13 | 12.26 | 8.41 | 5.95 | 18.56 |
| TD | 13.31 | 12.78 | 21.02 | 7.18 | 11.03 | 9.11 | 5.25 | 7.53 | 19.44 |
| Gurley Air Flow, sec/100 cc | 81 | 40 | | | 46 | 45 | | | 52 |
| Mullens Hydrostatic, kPa | 745 | 689 | 676 | 496 | 745 | 717 | 641 | 503 | 703 |
| MVTR, g/m² day | | | 868 | 761 | | 947 | 913 | 827 | |
| Methanol Bubble Point Pressure, kPa | 290 | 303 | | | 303 | 365 | | | 290 |
| Maximum Limiting Pore Diameter, μm | 0.077 | 0.074 | | | 0.074 | 0.061 | | | 0.077 |
| Maximum Pore Diameter, μm | | 111 | | | | >146 | | | |
| Volume Average Pore Diameter, μm | | 7.13 | | | | 4.70 | | | |
| Heat Shrinkage after 1 hr at 100° C., % | | | | | | | | | |
| MD | 11.7 | | 3.8 | 7.1 | 12.3 | | 15.3 | 6.3 | 7.7 |
| TD | 24.4 | | 23.6 | 11.8 | 22.0 | | 34.1 | 18.9 | 21.5 |

The biaxially stretched microporous sheet of Example 22 was examined by scanning electron microscopy at a magnification of 430X. A section taken in a plane perpendicular to the sheet surface and along the transverse direction showed pore elongation which was not as pronounced as along the machine direction. A view of the sheet surface (not sectioned) showed that large void structures were not as numerous as in views of either of the sections looking into the thickness.

TABLE VII

Properties of Biaxially Stretched Microporous Sheets Produced from Microporous Sheet of Example 3

| Example No. | 26 | 27 | 28 | 29 |
|---|---|---|---|---|
| Thickness, mm | 0.178 | 0.102 | 0.127 | 0.102 |
| Stretch Ratio | | | | |
| MD | 2 | 2 | 3 | 3 |
| TD | 3 | 3 | 3 | 4 |
| Line Speed m/min | 24.4 | 24.4 | 24.4 | 24.4 |
| MDS Preheat Temp., °C. | 79 | 79 | 79 | 79 |
| TDS Average Zonal Set Point Temps., °C. | | | | |
| Preheat (lower banks) | 177 | 149 | 177 | 177 |
| Stretch I (lower banks) | 177 | 149 | 177 | 177 |
| Stretch II | 171 | 188 | 171 | 171 |
| Stretch III | 142 | 149 | 142 | 142 |
| Sinter I | 144 | 149 | 144 | 144 |
| Sinter II | 227 | 260 | 227 | 227 |
| Weight, g/m² | 27 | 14 | 20 | 14 |
| Porosity, vol % | 90 | 91 | 90 | 92 |
| Matrix Tensile Strength, MPa | | | | |

TABLE VII-continued

Properties of Biaxially Stretched Microporous Sheets Produced from Microporous Sheet of Example 3

| Example No. | 26 | 27 | 28 | 29 |
|---|---|---|---|---|
| MD | 29.58 | 52.94 | 77.84 | 109.89 |
| TD | 122.73 | 44.43 | 32.96 | 39.90 |
| Elongation at break, % | | | | |
| MD | 90 | 47 | 27 | 17 |
| TD | 9 | 24 | 32 | 30 |
| Tear Strength, kN/m | | | | |
| MD | 15.41 | 10.51 | 15.24 | 7.18 |
| TD | 21.02 | 5.43 | 4.20 | 3.50 |
| Gurley Air Flow, sec/100 cc | 56 | 33 | | 36 |
| Mullens Hydrostatic, kPa | 552 | 655 | 641 | 586 |
| MVTR, g/m² day Methanol | 843 | 815 | 862 | 982 |
| Bubble Point Pressure, kPa | 303 | 276 | | 317 |
| Maximum Limiting Pore Diameter, μm | 0.074 | 0.081 | | 0.070 |
| Heat Shrinkage after 1 hr at 100° C., % | | | | |
| MD | 24.1 | 16.5 | 26.4 | |
| TD | 40.1 | 31.4 | 34.8 | |

Microporous Material Substrate Formation

Larger batch mixing equipment was employed than was used for Examples 1–7. Processing oil was used as the processing plasticizer. Silica, polymer, lubricant, and antioxidant in the amounts specified in Table VIII were placed in a high intensity mixer and mixed at high speed for 6 minutes. The processing oil needed to formulate the batch was pumped into the mixer over a period of 12–18 minutes with high speed agitation. After completion of the processing oil addition a 6 minute high speed mix period was used to complete the distribution of the processing oil uniformly throughout the mixture.

TABLE VIII

| | Formulations | | |
|---|---|---|---|
| | Example | | |
| Ingredient | 30 | 31 | 32 |
| UHMWPE (1), kg | 24.04 | 17.24 | 17.24 |
| HDPE (2), kg | 0.00 | 6.80 | 6.80 |
| Precipitated Silica (3), kg | 59.87 | 59.87 | 59.87 |
| Lubricant (4), g | 300.0 | 300.0 | 600.0 |
| Antioxidant (5) g | 300.0 | 300.0 | 0.0 |
| (6) g | 0.0 | 0.0 | 100.0 |
| Processing Oil (7), kg | | | |
| in Batch | 91.63 | 91.63 | 91.63 |
| at Extruder | ~35.14 | ~35.14 | ~35.14 |

(1) UHMWPE = Ultrahigh Molecular Weight Polyethylene, Himont 1900, Himont, U.S.A., Inc.
(2) HDPE = High Density Polyethylene
(3) HiSil ® SBG, PPG Industries, Inc.
(4) Petrac ® CZ81, Desoto, Inc., Chemical Speciality Division
(5) Irganox ® B-215, Ciba-Geigy Corp.
(6) Irganox ® 1010, Ciba-Geigy Corp.
(7) Shellflex ® 371, Shell Chemical Co.

The batch was then processed according to the general procedures described in respect of Examples 1–7 to form microporous sheets.

The microporous sheets, as well as the hereinafter described biaxially stretched microporous sheets produced therefrom, were tested for various physical properties. Table II identifies the properties with the methods used for their determination. The results of physical testing of the microporous sheets are shown in Table IX. The abbreviations MD and TD have the same meanings previously discussed.

TABLE IX

| Physical Properties of Microporous Sheet | | | |
|---|---|---|---|
| Example No. | 30 | 31 | 32 |
| Thickness, mm | 0.267 | 0.254 | 0.255 |
| Strip Tensile Strength, kN/m | | | |
| MD | 3.42 | | |
| TD | 1.52 | | |
| Breaking Factor, kN/m | | | |
| MD | | 3.44 | 3.23 |
| TD | | 1.42 | 1.52 |
| Elongation at break, % | | | |
| MD | 391 | 477 | 688 |
| TD | 448 | 451 | 704 |
| Processing Oil Content, wt % | 2.8 | 3.3 | 3.1 |

Biaxial Stretching of Microporous Sheet

Portions of the microporous materials produced in Examples 30 and 31 were unwound from cores and biaxially stretched by first uniaxially stretching in the machine direction using a single stage roll-to-roll MDS unit and then essentially uniaxially stretching in the transverse direction using a moving clip tenter frame as a TDS unit.

Operation of the MDS unit can be characterized by the temperatures and line speeds shown in Table X.

TABLE X

| | | MDS Unit Parameters | | |
|---|---|---|---|---|
| Roll No. | Function | Diameter, mm | Temperature, °C. | Peripheral Speed, m/min |
| 1 | Preheat | 305 | 116 | 3.84 |
| 2 | Preheat | 305 | 116 | 3.84 |
| 3 | Stretching | 152 | 127 | 3.84 |
| 4 | Stretching | 152 | 127 | 11.52 |
| 5 | Annealing | 305 | 79 | 11.53 |
| 6 | Cooling | 305 | 38 | 11.53 |

The gap between the slow and fast stretching rolls (Rolls 3 and 4, respectively) was 0.533 millimeter.

The TDS unit was a typical chain and clip tentering frame machine. It comprised three contiguous heating zones, each 2.54 meters in length where the beginning of the first heating zone coincided with the entrance to the TDS unit. The microporous sheet was heated by recirculating hot air in the heating zones. The heating zone temperatures are indicated in Table XI, where heating zone numbers increase in the direction of sheet travel.

TABLE XI

| Heating Zone Temperature | |
|---|---|
| Heating Zone | Temperature, °C. |
| 1 | 107 |
| 2 | 116 |
| 3 | 121 |

Stretching was controlled by positioning the tracks in which the chains holding the gripping clips rode. Microporous sheets, which had been uniaxially stretched in the machine direction as described above, were introduced to the TDS unit which had the track geometry shown in Table XII.

TABLE XII

| Track Geometry of TDS Unit | |
|---|---|
| Distance from Entrance, meters | Width, meters |
| −0.30 | 0.53 |
| +1.22 | 0.53 |
| 2.01 | 0.53 |
| 2.74 | 0.74 |
| 3.51 | 0.97 |
| 4.27 | 1.17 |
| 5.03 | 1.38 |
| 5.79 | 1.60 |
| 7.32 | 1.60 |
| 7.92 | 1.57 |

The properties of representative samples of biaxially stretched microporous sheets are given in Table XIII.

TABLE XIII

| Properties of Biaxially Stretched Microporous Sheets | | |
|---|---|---|
| Example No. | 33 | 34 |
| Microporous Sheet Feedstock, Example No. | 30 | 31 |
| Thickness, mm | 0.228 | 0.250 |
| Stretch Ratio | | |
| MD | 3 | 3 |
| TD | 3 | 3 |
| Line Speed, m/min | 13.4 | 13.4 |
| Weight, g/m$^2$ | 19.67 | 21.56 |
| Porosity, vol % | 92.1 | 91.1 |
| Breaking Factor, kN/m | | |
| MD | 1.175 | 1.158 |
| TD | 0.716 | 0.412 |
| Elongation at break, % | | |
| MD | 41 | 39 |
| TD | 54 | 61 |
| Gurley Air Flow, sec/100 cc | 41 | 48 |
| Mullens Hydrostatic, kPa | 600 | 579 |

Cornoa Treatment of Microporous Sheet

A portion of the roll stock of Example 1 and a portion of the roll stock of Example 1A were corona-treated using conventional procedures and equipment for corona treating plastic film.

Conventional Offset Lithographic Printing of Microporous Material Substrates

Several of the microporous material substrates described above were cut into sheets and printed by conventional offset lithographic printing techniques using a sheet-fed offset lithographic printing press. Three different lithographic inks were used, namely, an oil-based ink (CML Oil Base Plus), a rubber-based ink (Rubber Base Plus), and a third ink (Tough-tex TM). All inks were obtained from Van Son Holland Ink Corporation of America. A correlation of the microporous material substrates with the inks used in printing on the substrates is shown by the X's in Table XIV.

TABLE XIV

| Correlation of Microporous Substrates and Lithographic Inks | | | | |
|---|---|---|---|---|
| Example | Substrate Example | CML Oil Base Plus | Rubber Base Plus | Tough-tex |
| 35 | 1 | | X | |
| 36 | 1 | | X | |
| 37 | 1A (corona treated) | X | X | X |
| 38 | 1A (corona treated) | | X | |
| 39 | 4 | | X | |
| 40 | 5 | X | X | X |
| 41 | 6 | | X | |
| 42 | 7 | | X | |

The quality of the printed images was assessed by viewing the surfaces and cross-sections through printed areas under a 60X microscope fitted with a reticle. The reticle was calibrated in 0.001 inches (0.024 mm). With all printed microporous material substrates and all three inks, good resolution of dots in halftone images was obtained. Dot sizes as small as 0.07 millimeter were fully covered and very circular. Line widths of 0.1 millimeter exhibited uniform coverage and good edge definition. The ink coverage of all three inks was more uniform on the uncoated microporous material substrates than on uncoated paper. With paper substrates, all three of the tested inks coated the uppermost fibers of the surface, leaving significant uncoated areas where the fibers were slightly beneath the level of the uppermost fibers.

All of the microporous material substrate and ink combinations tested exhibited rapid dry times and were characterized by the lack of offset, that is, ink from the printed surface of one sheet did not transfer to the back of the next sheet printed as the sheets were stacked in the output tray of the press.

Microporous material substrates of Example 32 were cut into sheets and printed to form posters on a 28 inch×40 inch (71.12 centimeter×101.6 centimeter) Sheetfed Heidelberg Speedmaster six-color press. The sheets were printed at 6000 impressions per hour with minimum water, no heat, and no offset powder. All driving wheels were moved to the outside of the sheet on the in-line feed mechanism. Color separations were accomplished on a Crosfield Magnascan 6451M unit with Scanview 600 Previewer in 175 lines per inch (68.9 lines per centimeter) screen. The printing plates were prepared on Kodak plates and the blankets used were Reeves 714 Quick Release-Compressible blankets. The pH factor was 4.5 with a 15 percent alcohol solution. Inks used were from BASF Corporation/Inmont Commercial Ink Division and were with normal tack. Ink rotation was matched blue, cyan, magenta, yellow, and black. The poster contained a black reverse at the top of the poster, halftones, and line printing. The black reverse exhibited uniformity of solid color. The microporous substrate allowed even the finest halftones to vignette softly to the end of shadows. Square finish and outline halftones reproduced sharply. Line printing reproduced sharply. The same press operating under the same conditions was used to print the same poster on microporous material similar to that of Example 32 but having a thickness of about 0.457 millimeter. An Inline Coating Tower applied an aqueous coating to these thicker posters as they left the press. A pattern of foil stamping was later applied to an unprinted area of the coated posters with USE Foil No. 5813M on a KSBA Heidelberg cylinder press at 1500 impressions per hour, under the pressure provided by a 0.9144 millimeter thickness of packing on the cylinder, and at a temperature of 188° C. The printing quality was as described above in respect of the thinner posters. The coating quality and the effect of foil stamping were both excellent.

Ink Jet Printing of Microporous Material Substrates

Microporous material substrates of Example 1, Example 1 (corona treated) and Example 4 were printed by conventional ink jet printing techniques using a Hewlett-Packard Think-Jet ® printer and water-based ink jet printing ink (Hewlett Packard, Black, Part No. 92261A). For control, the recommended paper (Hewlett Packard Ink-Jet Paper, Reorder No. 92261N, Mode 1186) was also used as a substrate. The printer delivers 96 dots per inch (38 dots per millimeter) in both the vertical and the horizontal directions. With all of the microporous material substrates tested, good resolution of the ink dots was seen. Each dot was found to be a separated image relatively circular in outline. No splatter of ink around the primary dots was observed. The ink dots on the paper substrate were found to be large enough that adjacent dots touched. The results of microscopic examination of the printed substrates using the 60X microscope described above, are shown in Table XV.

TABLE XV

Microscopic Examination of Ink Jet Printed Substrates

| Example | Substrate Example | Average Dot Diameter, mm | Average Dot Depth, mm |
|---|---|---|---|
| 43 | 1 | 0.13–0.15 | 0.03 |
| 44 | 1 (corona treated) | 0.13–0.18 | 0.03 |
| 45 | 4 | 0.13–0.18 | 0.05 |
| Control | Paper | 0.25–0.33 | 0.05 |

Rubber Stamp Printing of Microporous Material Substrates

Using approximately equal pressure, microporous material substrates of Examples 9, 10, 15, 17, 18, 21, 26, and 27 and a paper substrate were printed using a Multimax self-inking rubber stamp. The printed substrates were tested for ink dryness by rubbing with a finger. The ink on all of the printed microporous substrates was found to be dry in less than a minute after printing, whereas the ink on the printed paper substrate was found to be wet one minute after printing.

Although the present invention has been described with reference to specific details of certain embodiments thereof, it is not intended that such details should be regarded as limitations upon the scope of the invention except insofar as they are included in the accompanying claims.

We claim:
1. Printed microporous material comprising:
   (a) a microporous material substrate having at least one surface and comprising:
      (1) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof,
      (2) finely divided particulate substantially water-insoluble siliceous filler distributed throughout said matrix, said filler constituting from about 50 percent to about 90 percent by weight of said microporous material substrate, and
      (3) a network of interconnecting pores communicating throughout said microporous material substrate, said pores constituting at least about 35 percent by volume of said microporous material substrate, and
   (b) printing ink on at least a portion of said surface in the form of indicia, one or more patterns, one or more designs, or a combination thereof.

2. The printed microporous material of claim 1 wherein said essentially linear ultrahigh molecular weight polyolefin is essentially linear ultrahigh molecular weight polyethylene having an intrinsic viscosity of at least about 18 deciliters/gram.

3. The printed microporous material of claim 2 wherein high density polyethylene is present in said matrix.

4. The printed microporous material of claim 2 wherein said pores constitute at least about 60 percent by volume of said microporous material substrate.

5. The printed microporous material of claim 2 wherein said ultrahigh molecular weight polyethylene has an intrinsic viscosity in the range of from about 18 to about 39 deciliters/gram.

6. The printed microporous material of claim 2 wherein said filler constitutes from about 50 percent to about 85 percent by weight of said microporous material substrate.

7. The printed microporous material of claim 2 wherein said filler is silica.

8. The printed microporous material of claim 2 wherein said filler is precipitated silica.

9. The printed microporous material of claim 8 wherein said precipitated silica has an average ultimate particle size of less than about 0.1 micrometer.

10. The printed microporous material of claim 2 wherein the volume average diameter of said pores as determined by mercury porosimetry is in the range of from about 0.02 to about 50 micrometers.

11. The printed microporous material of claim 2 wherein the volume average diameter of said pores as determined by mercury porosimetry is in the range of from about 0.02 to about 0.5 micrometers.

12. The printed microporous material of claim 2 wherein said printing ink is a lithographic printing ink.

13. The printed microporous material of claim 2 wherein said printing ink is an offset lithographic printing ink.

14. The printed microporous material of claim 2 wherein said printing ink is a letterpress printing ink.

15. The printed microporous material of claim 2 wherein said printing ink is a water-based ink jet printing ink.

16. The printed microporous material of claim 15 wherein said ink jet printing ink is on a portion of said surface in the form of a bar code pattern.

17. A method for producing printed microporous material comprising printing printing ink upon at least one surface of a microporous material substrate wherein said microporous material substrate comprises:
   (a) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof, (b) finely divided particulate substantially water-insoluble siliceous filler distributed throughout said matrix, said filler constituting from about 50 percent to about 90 percent by weight of said microporous material substrate, and (c) a network of interconnecting pores communicating throughout said microporous material substrate, said pores constituting at least about 35 percent by volume of said microporous material substrate.

18. The method of claim 17 wherein said essentially linear ultrahigh molecular weight polyolefin is essentially linear ultrahigh molecular weight polyethylene having an intrinsic viscosity of at least about 18 deciliters/gram.

19. The method of claim 18 wherein high density polyethylene is present in said matrix.

20. The method of claim 18 wherein said pores constitute at least about 60 percent by volume of said microporous material substrate.

21. The method of claim 18 wherein said ultrahigh molecular weight polyethylene has an intrinsic viscosity in the range of from about 18 to about 39 deciliters/gram.

22. The method of claim 18 wherein said filler constitutes from about 50 percent to about 85 percent by weight of said microporous material substrate.

23. The method of claim 18 wherein said filler is silica.

24. The method of claim 18 wherein said filler is precipitated silica.

25. The method of claim 24 wherein said precipitated silica has an average ultimate particle size of less than about 0.1 micrometer.

26. The method of claim 18 wherein the volume average diameter of said pores as determined by mercury porosimetry is in the range of from about 0.02 to about 50 micrometers.

27. The method of claim 18 wherein the volume average diameter of said pores as determined by mercury porosimetry is in the range of from about 0.02 to about 0.5 micrometers.

28. The method of claim 18 wherein said printing is accomplished by lithography and wherein said printing ink is a lithographic printing ink.

29. The method of claim 18 wherein said printing is accomplished by offset lithography and wherein said printing ink is an offset lithographic printing ink.

30. The method of claim 18 wherein said printing is accomplished by letterpress printing and wherein said printing ink is a letterpress printing ink.

31. The method of claim 18 wherein said printing is accomplished by ink jet printing and wherein said printing ink is a water-based ink jet printing ink.

32. The method of claim 31 wherein said ink jet printing ink is printed upon said surface of said microporous material substrate in the form of a bar code.

33. Printed microporous material comprising:
(a) a microporous material substrate having at least one surface and comprising:
(1) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypylene having an intrinsic viscosity of at least about 6 deciliters/gram, or a mixture thereof, (2) finely divided particulate substantially water-insoluble siliceous filler distributed throughout said matrix, said filler constituting from about 50 percent to about 90 percent by weight of said microporous material substrate, and (3) a network of interconnecting pores communicating throughout said microporous material substrate, said pores constituting from about 35 to about 80 percent by volume of said microporous material substrate, and (b) printing ink on at least a portion of said surface in the form of indicia, one or more patterns, one or more designs, or a combination thereof.

34. The printed microporous material of claim 33 wherein said essentially linear ultrahigh molecular weight polyolefin is essentially linear ultrahigh molecular weight polyethylene having an intrinsic viscosity of at least about 18 deciliters/grams.

35. The printed microporous material of claim 34 wherein high density polyethylene is present in said matrix.

36. The printed microporous material of claim 34 wherein said pores constitute from about 60 to about 75 percent by volume of said microporous material substrate.

37. The printed microporous material of claim 34 wherein said ultrahigh molecular weight polyethylene has an intrinsic viscosity in the range of from about 18 to about 39 deciliters/gram.

38. The printed microporous material of claim 34 wherein said filler constitutes from about 50 percent to about 85 percent by weight of said microporous material substrate.

39. The printed microporous material of claim 34 wherein said filler is silica.

40. The printed microporous material of claim 34 wherein said filler is precipitated silica.

41. The printed microporous material of claim 40 wherein said precipitated silica has an average ultimate particle size of less than about 0.1 micrometer.

42. The printed microporous material of claim 34 wherein the volume average diameter of said pores as determined by mercury porosimetry is in the range of from about 0.02 to about 0.5 micrometers.

43. The printed microporous material of claim 34 wherein said printing ink is a lithographic printing ink.

44. The printed microporous material of claim 34 wherein said printing ink is an offset lithographic printing ink.

45. The printed microporous material of claim 34 wherein said printing ink is a letterpress printing ink.

46. The printed microporous material of claim 34 wherein said printing ink is a water-based ink jet printing ink.

47. The printed microporous material of claim 46 wherein said ink jet printing ink is on a portion of said surface in the form of a bar code pattern.

48. A method for producing printed microporous material comprising printing printing ink upon at least one surface of a microporous material substrate wherein said microporous material substrate comprises:
(a) a matrix consisting essentially of essentially linear ultrahigh molecular weight polyolefin which is essentially linear ultrahigh molecular weight polyethylene having an intrinsic viscosity of at least about 18 deciliters/gram, essentially linear ultrahigh molecular weight polypropylene having an intrinsic viscosity of at least about 6 deciliters/gram, or a mixture thereof,
(b) finely divided particulate substantially water-insoluble siliceous filler distributed throughout said matrix, said filler constituting from about 50 percent to about 90 percent by weight of said microporous material substrate, and
(c) a network of interconnecting pores communicating throughout said microporous material substrate, said pores constituting from about 35 to about 80 percent by volume of said microporous material substrate.

49. The method of claim 48 wherein said essentially linear ultrahigh molecular weight polyolefin is essentially linear ultrahigh molecular weight polyethylene having an intrinsic viscosity of at least about 18 deciliters/gram.

50. The method of claim 49 wherein high density polyethylene is present in said matrix.

51. The method of claim 49 wherein said pores constitute from about 60 to about 75 percent by volume of said microporous material substrate.

52. The method of claim 49 wherein said ultrahigh molecular weight polyethylene has an intrinsic viscosity in the range of from about 18 to about 39 deciliters/gram.

53. The method of claim 49 wherein said filler constitutes from about 50 percent to about 85 percent by weight of said microporous material substrate.

54. The method of claim 49 wherein said filler is silica.

55. The method of claim 49 wherein said filler is precipitated silica.

56. The method of claim 55 wherein said precipitated silica has an average ultimate particle size of less than about 0.1 micrometer.

57. The method of claim 49 wherein the volume average diameter of said pores as determined by mercury porosimetry is in the range of from about 0.02 to about 0.5 micrometers.

58. The method of claim 49 wherein said printing is accomplished by lithography and wherein said printing ink is a lithographic printing ink.

59. The method of claim 49 wherein said printing is accomplished by offset lithography and wherein said printing ink is an offset lithographic printing ink.

60. The method of claim 49 wherein said printing is accomplished by letterpress printing and wherein said printing ink is a letterpress printing ink.

61. The method of claim 49 wherein said printing is accomplished by ink jet printing and wherein said printing ink is a water-based ink jet printing ink.

62. The method of claim 61 wherein said ink jet printing ink is printed upon said surface of said microporous material substrate in the form of a bar code.

* * * * *